United States Patent

Nordseth et al.

[15] 3,662,104
[45] May 9, 1972

[54] ELECTRONIC AREA CORRELATOR WITH MULTIPLE INPUT SIGNALS

[72] Inventors: Marvin P. Nordseth, Corona; Werner G. Hueber, Riverside, both of Calif.

[73] Assignee: The United States of America as represented by the Secretary of the Navy

[22] Filed: Apr. 25, 1968

[21] Appl. No.: 725,270

Related U.S. Application Data

[63] Continuation-in-part of Ser. No. 614,530, Feb. 1, 1967, abandoned.

[52] U.S. Cl.................................................178/6.8, 315/10
[51] Int. Cl. ...........................................................H04n 3/16
[58] Field of Search .........................178/6.8; 315/10, 12, 11

[56] References Cited

UNITED STATES PATENTS

| | | | |
|---|---|---|---|
| 3,566,019 | 2/1971 | Koch | 315/11 |
| 3,496,290 | 2/1970 | Smith | 315/11 |

Primary Examiner—Rodney D. Bennett, Jr.
Assistant Examiner—N. Moskowitz
Attorney—G. J. Rubens and J. M. St. Amand

[57] ABSTRACT

A closed loop electronic area correlation tracker consisting of an electronic image storage tube with microchannel electron multipliers as input devices to allow use of a multiplicity of simultaneous input signals supplied from a matrix type input sensor and the like.

4 Claims, 4 Drawing Figures

MARVIN P. NORDSETH
WERNER G. HUEBER
INVENTORS

BY J. M. St. Amand
ATTORNEY

MARVIN P. NORDSETH
WERNER G. HUEBER
INVENTORS

BY
ATTORNEY

ELECTRONIC AREA CORRELATOR WITH MULTIPLE INPUT SIGNALS

This invention is a continuation-in-part of U. S. Pat. application Ser. No. 614,530, filed Feb. 1, 1967, now abandoned, and is related to U. S. Pat. No. 3,315,032 issued Apr. 18, 1967 for Imaging System and U. S. Pat. application Ser. No. 470,649, now U.S. Pat. No. 3,379,833 issued Apr. 23, 1968 for Controllable Television Raster Generator, both filed July 8, 1965.

The invention herein described may be manufactured and used by or for the Government of the United States of America for governmental purposes without the payment of any royalties thereon or therefor.

This invention relates to auto-correlation of two images. Correlation trackers have been built in which the input is a sequentially scanned signal or an optical image. However, the multiple signal output matrix type of sensor is becoming more common. The matrix sensor is now being utilized in solid-state optical imaging devices, in infrared detectors, in multiple element radar antennas and microwave radiometers. In some of these sensors each of the rows but not the columns is sequentially scanned. Most existing correlation trackers cannot be adapted to a matrix type of sensor. The present invention, however, provides a system for determining the motion of one image obtained from a matrix sensor with respect to a stored image.

Other objects and many of the attendant advantages of this invention will become readily appreciated as the same becomes better understood by reference to the following detailed description when considered in connection with the accompanying drawings wherein.

Figure 1:
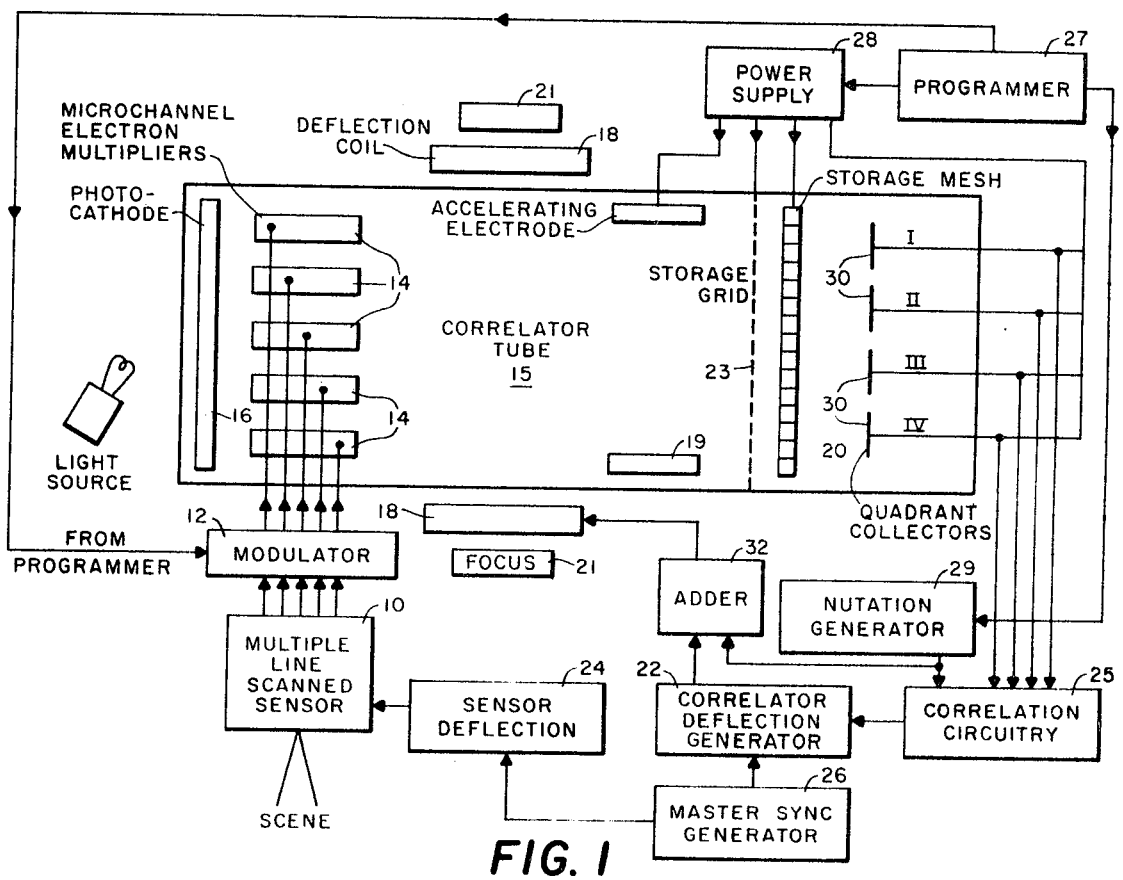
FIG. 1 is an embodiment of the invention showing a block diagram of an electronic area correlator with multiple input channels.

As shown in FIG. 1, the input signals from a scene, which may be derived from a multiple line scanned optical sensor 10, infrared radar sensors, microwave radiometers or the like modulate via modulator 12 the gain of microchannel electron multipliers 14 (one for each line) in correlator tube 15. Multiple line scanned sensor 10 may consist of rows and columns (e.g., a matrix) of individual sensors such as photodiodes, phototransistors, individual infrared sensors, or individual antennas for radar or radiometer applications. A row of sensors or the like can be provided for each line. Modulator 12 may be any well-known circuit, such as used in amplitude modulation of transmitters, etc. This modulator varies the voltage across the microchannel electron multipliers 14 as a function of the sensor voltage. Electron multipliers 14 are of the type disclosed in U.S. Pat. No. 3,128,408 and are fed electrons from an electron source such as a floodgun or from an illuminated photocathode 16 or the like. In the storage mode of the device the electrons leaving the microchannel electron multipliers are deflected by deflection coil 18 and accelerated by means of an accelerating electrode 19 so that they form a charge pattern on the storage mesh 20. Focus coil 21 is provided for electron image focusing. The synchronization signals for the correlator deflection generator 22 and sensor deflection generator 24 are generated by the master synchronization generator 26 which is of the type used in standard television circuits. Correlation deflection generator 22 is a standard television deflection type circuit such as described in the text *Television* by V. K. Zworykin and G. A. Morton (Wiley 1940); this circuit is used in standard TV cameras. The sensor deflection generator 24 is merely a switching circuit which provides a signal for sampling the voltage of each sensor multiple line scanned sensor 10. Master synchronization generator 26 is of the types used in standard television cameras and are also disclosed in the aforementioned text, *Television* by V. K. Zworykin and G. A. Morton. Storage mesh 20 consists of a back plate and a dielectric which may be of the type used in recording storage tubes (e.g., Raytheon, Type CK 7571). A storage grid 23 mounted close to the storage mesh 20 removes the secondary emitted electrons.

As in other electronic storage tubes (e.g., Raytheon, Type CK 7571), the old charge pattern has to be removed (erase mode) and a uniform charge pattern has to be established (prime mode) before a new pattern can be stored (store mode).

In the "store" mode of the device the signals from the multiple line scanned sensor 10 modulate the gain of the microchannel electron multipliers 14 thus generating a charge pattern on the storage mesh 20. The programmer 27 switches the power supply 28 for the correlation tube 15 so that the tube operates in the various erase, prime, and store modes and also provides the signal to turn off the nutation generator 29 during the store and erase modes. Nutation generator 29 consists of two oscillators which are phase shifted by 90° so that sine and cosine signals are available; these two signals are then applied to the horizontal and verticle deflection of the correlator tube to cause the image to nutate. The modes of the correlator tube 15 are controlled in the same manner as is done in other electronic tubes, such as aforementioned. In the correlation or read mode this pattern acts as modulator for the subsequently obtained signals from the microchannel electron multipliers 14. The number of electrons passing through the storage mesh 20 and landing on the four quadrants collector 30 is therefore a function of the position of the viewed image of the scene with respect to the stored image. Thus, the sensor signals will be correlated with the reference signal stored on the mesh 20 and the collector signal will give a measure of the amount of mismatch between the two images.

Figure 2:
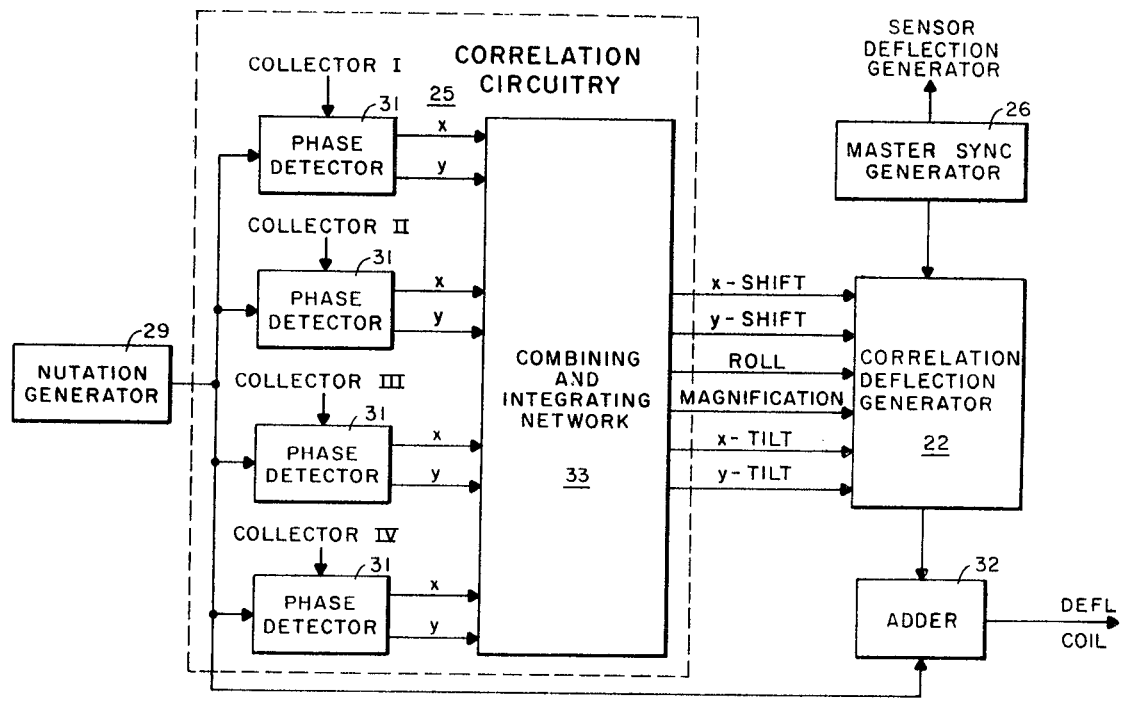
FIG. 2 shows a block diagram of correlation and deflection circuitry for the electronic area correlator with multiple input signals.
Figure 3:
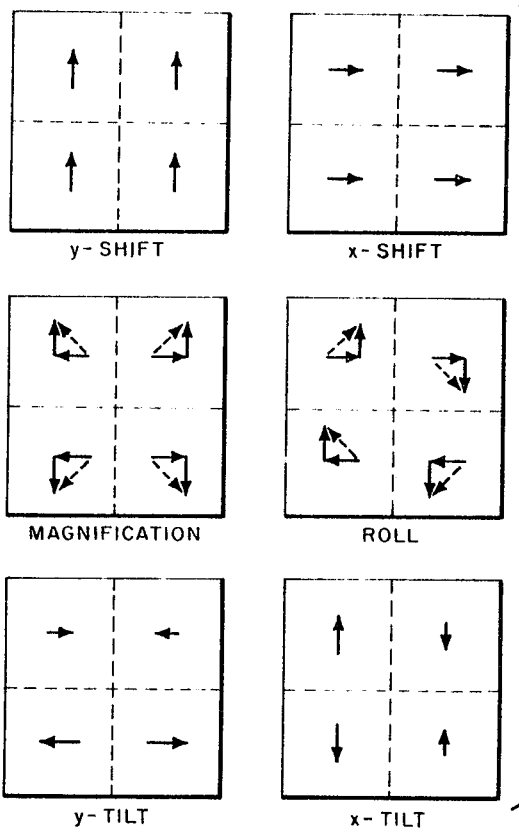
FIG. 3 shows diagrams for illustrating the six degrees of motion (error signal) for each quadrant of the collector.

In order to obtain directional information it is necessary to introduce low-amplitude circular displacement of the incoming signal with respect to the stored image. This is accomplished, as shown in FIG. 2, by adding via a resistive type adder 32 or the like nutation signals from the nutation generator 29 to the output of the correlator deflection generator 22. This nutation signal is also the reference for the four phase detectors 31 of correlation circuitry 25 which also receive signals from the four quadrants of collector 30 (i.e., collectors I, II, III, and IV). The output of the phase detectors 31 is a function of the amplitude and polarity of the mismatch between the incoming signal and the stored signal in each of the quadrants of collector 30. The four phase detector outputs will be combined and integrated by network 33 of correlation circuitry 25, as shown in FIG. 2, to obtain error signals for $x$- and $y$-shift, roll, magnification, and $x$- and $y$-tilt. Combining integrating network 33 consists of difference amplifiers in which displacement signals $\Delta x$ and $\Delta y$ are summed; the output of these amplifiers are added to form the equations. This combining and integrating network then simply integrates the resulting sum over a certain time. The combination is accomplished by adding the appropriate $x$- and $y$-error signals of each quadrant according to the following equations:

For $x$-shift:
$T_x = (\Delta x_1 + \Delta x_2 + \Delta x_3 + \Delta x_4)$
For $y$-shift:
$T_y = (\Delta y_1 + \Delta y_2 + \Delta y_3 + \Delta y_4)$
For magnification:
$T_M = (\Delta x_1 - \Delta x_2 - \Delta x_3 + \Delta x_4) + (\Delta y_1 + \Delta y_2 - \Delta y_3 - \Delta y_4)$
For roll:
$T_R = (\Delta x_1 + \Delta x_2 - \Delta x_3 - \Delta x_4) - (\Delta y_1 - \Delta y_2 - \Delta y_3 + \Delta y_4)$
For $x$-tilt:
$I_{TX} = -(\Delta y_1 - \Delta y_2 + \Delta y_3 - \Delta y_4)$
For $y$-tilt:
$I_{TY} = -(\Delta x_1 - \Delta x_2 + \Delta x_3 - \Delta x_4)$ Whereby $\Delta x$ and $\Delta y$ are error signals in $x$ and $y$ obtained from each of the four phase detectors 31. These equations are easily understood by referring to FIG. 3. A mathematical proof that the motion of an imaging device can be determined on the basis of the motions of three elements of the image can be found in aforementioned U. S. Pat. No. 3,315,032. For y-shift all the elements move to the top, for x-shift they move to one side of the image. For magnification all the elements in each quadrant move out of the image and for roll they move in a circular manner, if they are compared with the reference image.

These error signals are used to change the deflection so that the two images line up again. A deflection generator producing such signals is also described in aforementioned U.S. Pat. application, Ser. No. 470,649.

This invention provides a technique to utilize sensors with multiple output signals 10 (e.g., a matrix of sensors) for area correlation trackers. These sensors provide considerable savings in space, and are ruggedized. This invention also incorporates microchannel electron multipliers, one for each row of the sensor matrix 10 as input devices for an electronic area correlation tracker. A storage mesh 20 stores the information provided by the microchannel electron multipliers 14 and acts as modulating grid in the correlation mode of the system. The collector 30 is divided into four quadrants I, II, III, and IV, and the errors between the stored images an subsequently obtained new images are detected for each quadrant. These errors are added in a manner so that information is obtained about the motion of the incoming image with respect to the stored image in all six degrees of freedom. An electronic feedback loop compensates for these errors by adjusting the deflection of the device so that the incoming image and stored image match.

Figure 4:
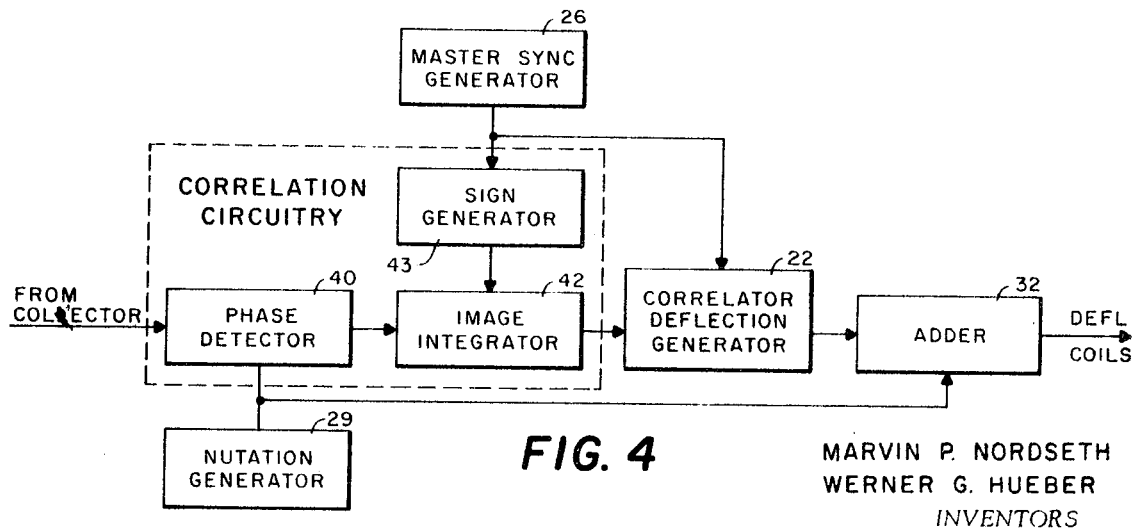
FIG. 4 shows a block diagram of another embodiment for the correlation and deflection circuitry.

An alternative embodiment is shown in FIG. 4 where a single collector covering the same area replaces the four-quadrant collectors, and the four phase detectors and network 33 of correlation circuitry 25, FIG. 2 are replaced with a phase detector 40 and gating circuit & integrator 42. Sign generator 43 provides gating signals for circuit 42. The function of circuit 42 is to generate the six error signals (i.e., $x$ and $y$ shift, magnification, roll, and $x$ and $y$ tilt, which represent the motion of the sensor with respect to the stored scene). Each of these error signals is obtained by adding selected up and down and/or left-right displacement signals with different signs according to the given equations. Sign generator 43 consists of AND and OR circuits which provide appropriate signals for the image integrator 42 so that displacement signals such as $\Delta x$ and $\Delta y$ are added with the appropriate signs. The error signal processing technique is also described in U. S. Pat. application, Ser. No. 510,167 filed Nov. 24, 1965 for "Target Area Sequential Correlator" where only one sensor can be used; however, in the instant invention multiple sensors are used and a completely different correlation process is used.

Another alternative is to store the microchannel electron multiplier signals on a long persistent phosphor storage mesh or similar integration device and write this information sequentially into a single ended cathode ray storage tube (e.g., Raytheon, Type CK 7571) by scanning the integration device with an electron beam. Correlation can then by accomplished by comparing the signal from the scanned integration device with the output signal of the cathode ray storage tube. The storage tube beam is wobbled across several storage tube resolution elements while the other beam, reading the integration device, only covers one resolution element. This nutation or wobbling can be avoided by having a multiple aperture readout of the integration device. Both of these techniques are also described in aforementioned U. S. Pat. application, Ser. No. 510,167.

Another alternative is to modulate the storage tube readout beam with the signal obtained from the integrating device. A nutation signal is applied to the storage tube deflection and phase detectors detect the amount of mismatch between the stored image and the new image.

Obviously many modifications and variations of the present invention are possible in the light of the above teachings. It is therefore to be understood that within the scope of the appended claims the invention may be practiced otherwise than as specifically described.

What is claimed is:

1. An electronic area correlator device for determining the motion of one image obtained from error signals with respect to a similar reference image, comprising:
   a. A multiple line scanned sensor means for viewing a scene,
   b. an electronic image storage correlator tube having
      1. a plurality of microchannel electron multipliers which are modulated by said multiple line scanned sensor means during select operation modes,
      2. an electron source for feeding electrons to said microchannel electron multipliers which in turn emit electron beams,
      3. storage means operable in separate ones of said select operation modes to have an electron charge reference pattern from said electron multipliers stored thereon, be erased, and be uniformly charged,
      4. a four-quadrant collector means positioned to collect electrons which pass through said storage means; the number of electrons passing through said storage means and thus landing on various quadrants of said collector means being a function of any mismatch between an incoming signal image of a scene viewed by said multiple line scanned sensor means with respect to a stored reference pattern,
   c. an electronic feedback loop connected to receive signals from the four quadrants of said collector means and use said signals to adjust the electron beam of electrons from the microchannel electron multipliers to said storage means to correct for any mismatch between the incoming signal image and said stored reference pattern.

2. A device as in claim 1 wherein said four-quadrant collector means consists of four individual collectors each covering a different quadrant of area behind said storage means.

3. A device as in claim 1 wherein said electronic feedback loop includes means for adding the error signals from said collector means so that information is obtained about the motion of the incoming signal image with respect to the stored reference pattern for six degrees of freedom, said information being used to control deflection of the electron beam for matching the incoming signal image with said stored reference pattern.

4. A device as in claim 1 wherein said multiple line scanned sensor means consist of an arrangement of sensors in rows and columns and wherein a different one of said plurality of microchannel electron multipliers is modulated for each row of sensors by said multiple line scanned sensor.

* * * * *